US012568887B2

(12) United States Patent
Meschke et al.

(10) Patent No.: US 12,568,887 B2
(45) Date of Patent: Mar. 10, 2026

(54) GRAIN CLEANING SYSTEM WITH GRAIN CHUTE

(71) Applicant: DEERE & COMPANY, Moline, IL (US)

(72) Inventors: Michael T. Meschke, Eldrige, IA (US); Yogesh N. Chande, Bettendorf, IA (US); Kevin P. Hurley, Davenport, IA (US); Nicholas J. Keener, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 558 days.

(21) Appl. No.: 18/155,433

(22) Filed: Jan. 17, 2023

(65) Prior Publication Data

US 2024/0237584 A1 Jul. 18, 2024

(51) Int. Cl.
*A01F 12/44* (2006.01)

(52) U.S. Cl.
CPC .................................. *A01F 12/446* (2013.01)

(58) Field of Classification Search
CPC .............................. A01F 12/44; A01F 12/446
USPC ............................. 460/101, 145, 90, 150, 84
See application file for complete search history.

(56) References Cited

U.S. PATENT DOCUMENTS

| | | | | | |
|---|---|---|---|---|---|
| 1,928,216 | A | * | 9/1933 | Apel | A01F 12/446 |
| | | | | | 209/397 |
| 2,253,296 | A | * | 8/1941 | Holtzman | A01F 12/446 |
| | | | | | 209/394 |

| | | | | | |
|---|---|---|---|---|---|
| 2,284,433 | A | * | 5/1942 | Korsmo | A01F 12/44 |
| | | | | | 460/84 |
| 6,056,639 | A | * | 5/2000 | Gryspeerdt | A01F 12/44 |
| | | | | | 460/145 |
| 7,585,213 | B2 | * | 9/2009 | Claerhout | A01F 12/44 |
| | | | | | 460/103 |
| 9,986,688 | B2 | * | 6/2018 | Stahl | A01F 7/06 |
| 10,257,983 | B2 | * | 4/2019 | Bilde | A01F 12/444 |
| 10,645,879 | B2 | | 5/2020 | Bilde | |
| 11,122,744 | B2 | * | 9/2021 | Wire | A01D 41/1208 |

(Continued)

FOREIGN PATENT DOCUMENTS

| | | | | | |
|---|---|---|---|---|---|
| BR | 112017021816 | B1 | * | 12/2021 | A01F 12/44 |
| DE | 3042737 | A1 | | 5/1981 | |
| EP | 3135097 | A1 | * | 3/2017 | A01D 5/282 |

(Continued)

*Primary Examiner* — Joseph M Rocca
*Assistant Examiner* — Sunny D Webb

(57) ABSTRACT

A grain cleaning system for use in an agricultural combine harvester comprises a return pan, a chaffer, and a grain chute. The return pan is arranged to reciprocate in a fore-aft manner to advance crop material forwardly and comprises openings allowing grain to fall from the return pan through the openings. The chaffer is arranged to reciprocate in a fore-aft manner to advance crop material rearwardly and underlies the return pan. The grain chute is positioned in communication with one or more openings of the openings in the return pan and in communication with the chaffer to guide grain received from the one or more openings to the chaffer in a manner that bypasses material-other-than-grain (MOG) advanced rearwardly by the chaffer. An agricultural combine harvester comprising a grain cleaning system with a grain chute is disclosed.

19 Claims, 15 Drawing Sheets

(56) References Cited

U.S. PATENT DOCUMENTS

2022/0015297  A1      1/2022   Jensen et al.

FOREIGN PATENT DOCUMENTS

| | | |
|---|---|---|
| FR | 2651088  A1 | 3/1991 |
| RU | 2589225  C2 | 7/2016 |

* cited by examiner

GRAIN CLEANING SYSTEM WITH GRAIN CHUTE

TECHNICAL FIELD

The present disclosure relates to grain cleaning systems for use in agricultural combine harvesters.

BACKGROUND

An agricultural combine harvester has a grain cleaning system for processing crop material so as to separate grain from material-other-than-grain (MOG). In some combine harvesters, the grain cleaning system has a return pan and a chaffer. The return pan may receive crop material from a threshing and separating system of the combine harvester and may receive tailings routed back to the grain cleaning system for further processing. The return pan advances the crop material forwardly. The chaffer is positioned under the return pan and advances crop material rearwardly. The chaffer has openings allowing grain in the crop material to separate therefrom and fall through the openings.

SUMMARY

According to an aspect of the present disclosure, there is disclosed a grain cleaning system for use in an agricultural combine harvester that moves in a forward direction of travel to harvest crop material from a field. The grain cleaning system comprises a return pan, a chaffer, and a grain chute. The return pan is arranged to reciprocate in a fore-aft manner to advance crop material forwardly and comprises openings allowing grain to fall from the return pan through the openings. The chaffer is arranged to reciprocate in a fore-aft manner to advance crop material rearwardly and underlies the return pan. The grain chute is positioned in communication with one or more openings of the openings in the return pan and in communication with the chaffer to guide grain received from the one or more openings to the chaffer in a manner that bypasses material-other-than-grain (MOG) advanced rearwardly by the chaffer.

According to another aspect of the present disclosure, there is disclosed an agricultural combine harvester that moves in a forward direction of travel to harvest crop material from a field. The agricultural combine harvester comprises a return pan, a chaffer, and a grain chute. The return pan is arranged to reciprocate in a fore-aft manner to advance crop material forwardly and comprises openings in a floor of the return pan for grain to fall through the openings. The chaffer is arranged to reciprocate in a fore-aft manner to advance crop material rearwardly. The grain chute is positioned in communication with one or more openings of the openings in the return pan and in communication with the chaffer to guide grain received from the one or more openings to the chaffer. The grain chute comprises a funnel coupled to the return pan for reciprocation therewith and a material-other-than-grain (MOG) diverter coupled to the chaffer for reciprocation therewith and positioned in front of the funnel to divert MOG around the funnel.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
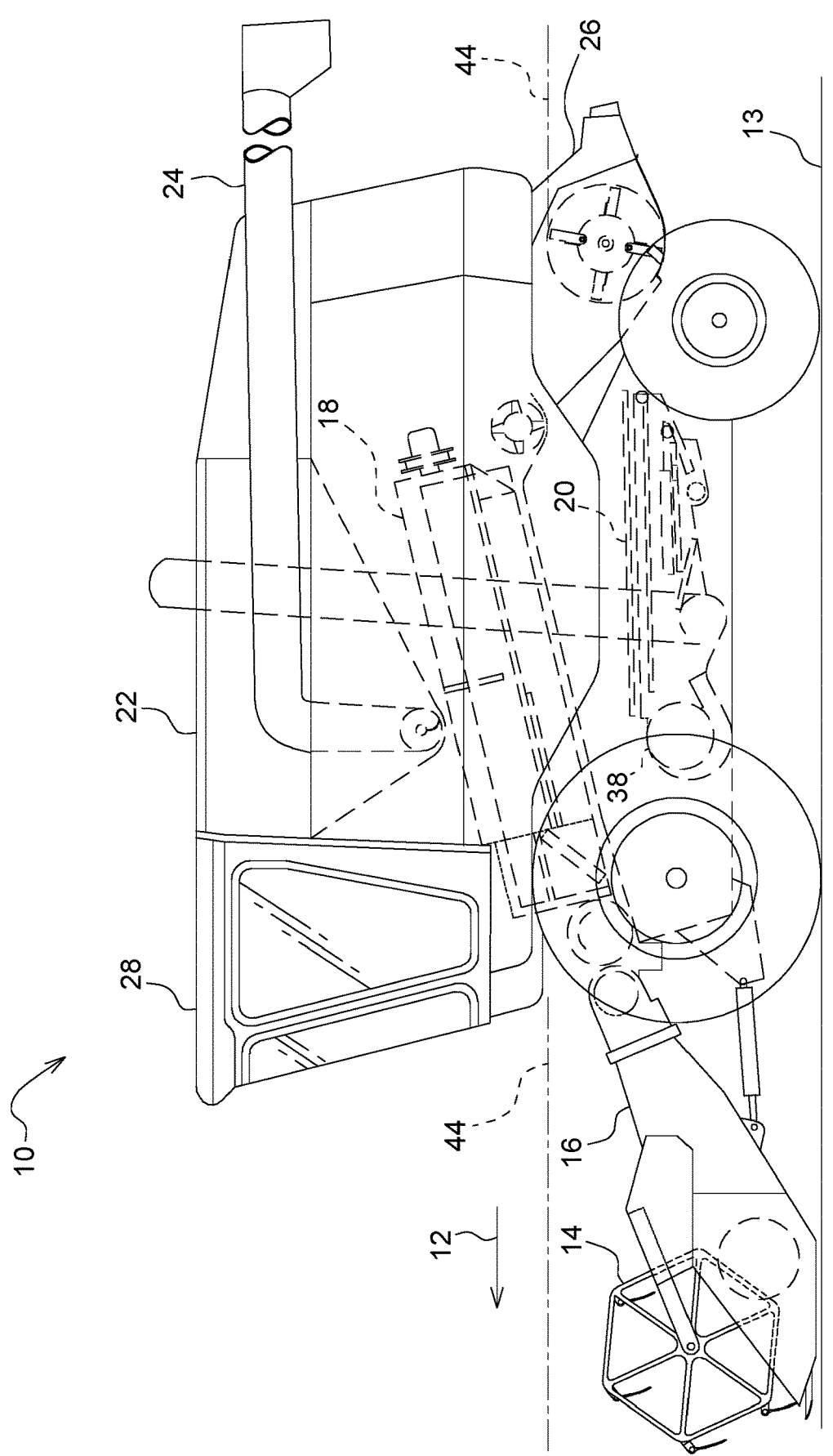
FIG. 1 a diagrammatic side elevational view, with portions broken away, showing an agricultural combine harvester with various functional systems including a cleaning system underlying a threshing and separating system.

Referring to FIG. 1, an agricultural combine harvester 10 is configured to move in a forward direction of travel 12 over a field 13 to harvest crop material from the field 13, as shown, for example, in FIG. 1. The harvester 10 processes the crop, separating grain from residual crop material known as material-other-than-grain or MOG (straw, stalks, cobs, leaves, chaff, etc.).

In general, the harvester 10 may include front-end equipment 14 to cut, gather, and transport crop material rearwardly (some front-end equipment 14 may not cut crop material, as in the case of a belt pick-up unit), a feederhouse 16 to advance crop material received from the equipment 14 into the body of the harvester 10, a threshing and separating system 18 to thresh crop material and separate grain from MOG, a grain cleaning system 20 to further separate grain from MOG, a clean grain elevator (not shown) to elevate clean grain to a storage bin 22, an unloader 24 to unload clean grain from the storage bin 22 to another location (e.g., a grain cart), and a residue system 26 to process and distribute crop residue back onto the field 13. A person can control the harvester 10 from an operator's station 28 of the harvester 10. The harvester 10 may be configured in a wide variety of ways.

The threshing and separating system 18 may include an axial rotor and a concave assembly. The rotor and the concave assembly cooperate to provide the threshing and separating system with a front threshing zone for threshing grain and a rear separating zone for separating threshed grain from MOG. In some examples, the threshing and separating system 18 includes a second rotor (not shown) and a second concave assembly (not shown), which cooperate to provide the threshing and separating system 18 with a second front threshing zone and a second rear separating zone. In such a case, the rotors are similar to one another in structure and function, and the concave assemblies are similar to one another in structure and function. The threshing and separating system 18 may be configured in a wide variety of ways.

Figure 2:
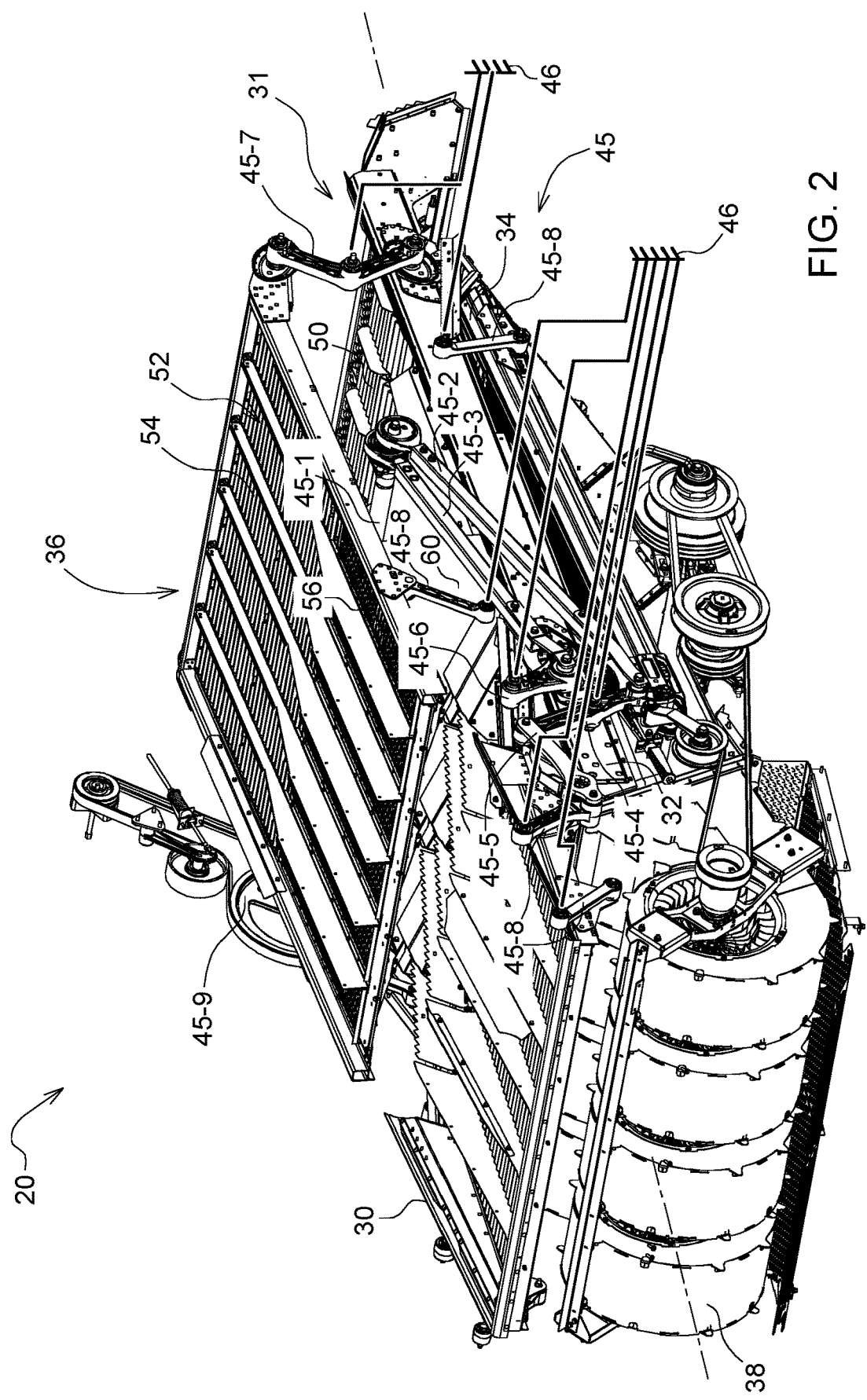
FIG. 2 is a front perspective view showing the cleaning system.
Figure 3:
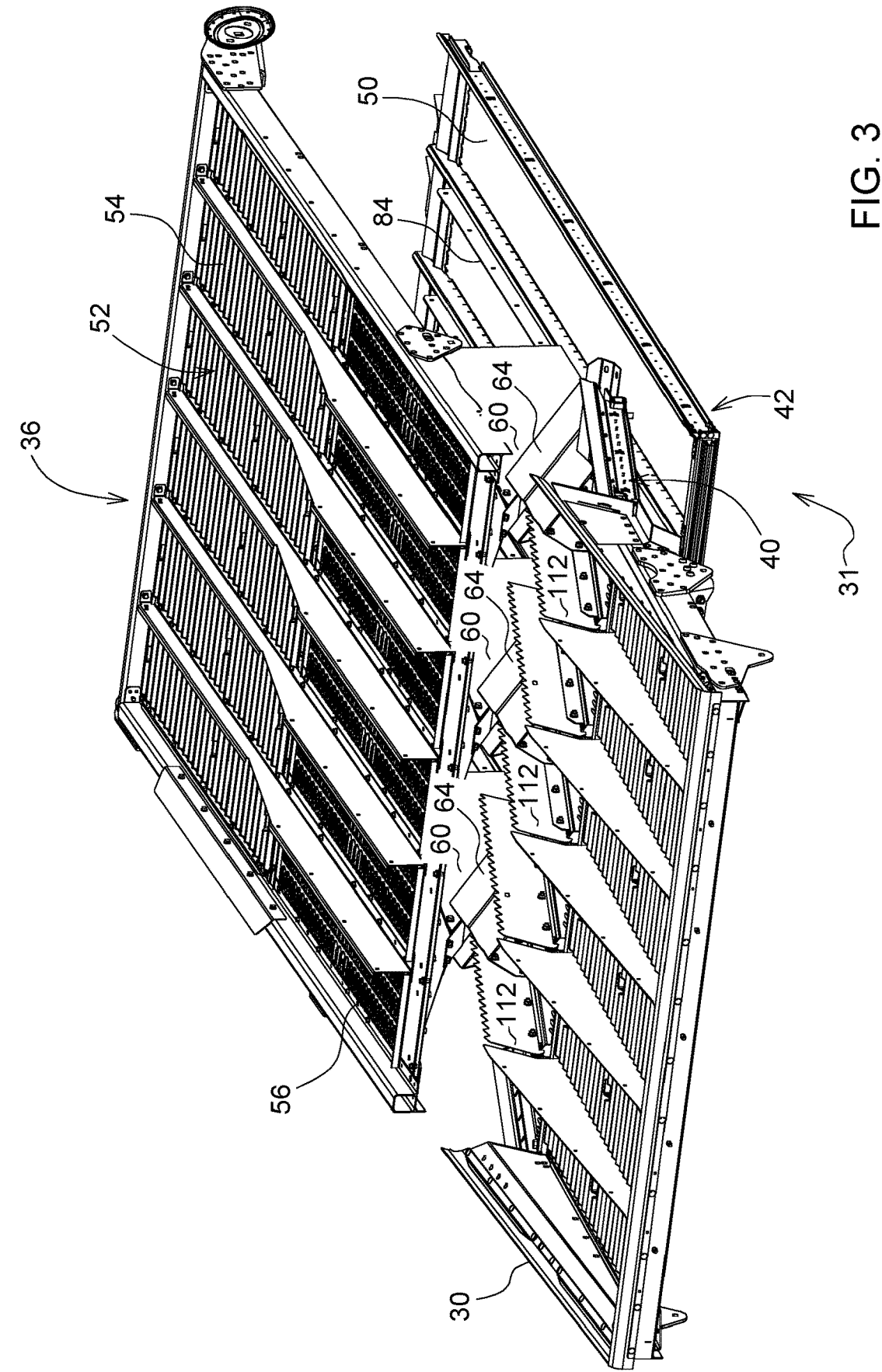
FIG. 3 is a front perspective view showing the cleaning system, with portions broken away, the cleaning system including a return pan, an underlying chaffer with a front chaffer and a main chaffer, and grain chutes positioned in lateral relation to one another and configured for guiding grain received from openings in the return pan to the main chaffer.

Referring to FIGS. 2 and 3, the grain cleaning system 20 may include a front step pan 30 (which may also be referred to as a preparation pan), a chaffer 31, a lower step pan 32 (which may also be referred to as a crash pan), a sieve 34, a return pan 36, and a fan assembly 38 (e.g., including four fans). The chaffer 31 includes a front chaffer 40 and a main chaffer 42 (each of the chaffer 31, the front chaffer 40, and the main chaffer 42 may be referred to as a sieve). The lower step pan 32 is mounted with the main chaffer 42 so as to be positioned in front of the main chaffer 42 and below the front chaffer 40. The front step pan 30, the chaffer 31 with its front chaffer 40 and main chaffer 42, the lower step pan 32, the sieve 34, and the return pan 36 are arranged to reciprocate in a fore-aft manner in a fore-aft dimension 44 of the combine harvester 10 to process and advance crop material.

A drive mechanism 45 imparts the fore-aft reciprocating movement. The drive mechanism 45 may include a rotary drive 45-1 and a linkage including a first drive link 45-2, a second drive link 45-3, a front rocker link 45-4, a pan link 45-5, a chaffer link 45-6, a rear rocker link 45-7, and a number of support links 45-8. The linkage is positioned on the left side of the combine harvester 10. The rotary drive 45-1 is rotated by a belt-driven pulley 45-9 positioned on the right side of the combine harvester 10.

The first and second drive links 45-2, 45-3 are coupled eccentrically to the rotary drive 45-1 such that rotation of the rotary drive 45-1 imparts a reciprocating motion to the first and second drive links 45-2, 45-3. The first drive link 45-2 is coupled to the front rocker link 45-4 which is coupled at a first end to the sieve 34 to reciprocate the sieve 34 and at an opposite second end to the pan link 45-5 that reciprocates the front step pan 30 and the front chaffer 40. As such, the sieve 34 reciprocates in a manner opposite to the pan 30 and the front chaffer 40. The second drive link 45-3 is coupled to the chaffer link 45-6 which is coupled to the main chaffer 42 to reciprocate the main chaffer 42. The rear rocker link 45-7 is coupled at a first end to the main chaffer 42 and at an opposite second end to the return pan 36 to reciprocate the return pan 36 in a manner opposite to the main chaffer 42 in response to reciprocation of the main chaffer 42. The support links 45-8 support the front step pan 30, the front chaffer 40, the lower step pan 32, the main chaffer 42, the sieve 34, and the return pan 36 on a support structure 46 (shown diagrammatically) of the combine harvester 10. A similar linkage is positioned on the right side of the combine harvester.

The front step pan 30, the front chaffer 40, the lower step pan 32, and the main chaffer 42 reciprocate in phase as a first unit. The sieve 34 and the return pan 36 reciprocate in phase as a second unit. The first and second units reciprocate 180 degrees out of phase with one another. The fore-aft reciprocating movement of the first and second units is relative to the support structure 46. It is to be appreciated that the front step pan 30, the front chaffer 40, the lower step pan 32, the main chaffer 42, the sieve 34, and the return pan 36 may be driven for reciprocating movement in any suitable manner.

The front step pan 30 is positioned under a front portion of the threshing and separating system 18 to receive crop material therefrom. Reciprocation of the pan 30 in a fore-aft manner in the fore-aft dimension 44 advances crop material rearwardly toward the front chaffer 40.

The return pan 36 is positioned under a rear portion of the threshing and separating system 18 (e.g., the rear separating zone) to receive crop material therefrom. Tailings may also be routed back to the return pan 36 for further processing by the cleaning system 20. Reciprocation of the return pan 36 in a fore-aft manner in the fore-aft dimension 44 advances crop material forwardly.

The chaffer 31 is arranged to receive crop material thereon and to reciprocate in a fore-aft manner in the fore-aft dimension 44 to process and advance crop material rearwardly. The chaffer 31 is rearward of the front step pan 30 to receive crop material therefrom and underlies the return pan 36 to receive crop material therefrom. The front chaffer 40 receives crop material from the front step pan 30 and crop material that falls over the front edge of the return pan 36.

The front chaffer 40 includes openings in a floor 48 of the front chaffer 40 for grain and smaller MOG to fall through the openings. The front chaffer 40 advances crop material that does not fall through its openings rearwardly toward the main chaffer 42.

The lower step pan 32 is positioned under the front step pan 30 to receive crop material therefrom (e.g., grain and smaller MOG). Reciprocation of the lower step pan 32 in a fore-aft manner in the fore-aft dimension 44 advances crop material rearwardly toward the main chaffer 42.

The main chaffer 42 is arranged to receive crop material thereon and reciprocate in a fore-aft manner in the fore-aft dimension 44 to process crop material. The main chaffer 42 is positioned in proximity to the front chaffer 40 and rearward thereof to receive crop material therefrom. The main chaffer 42 is positioned lower than, and extends rearwardly away from, the front chaffer 40. The main chaffer 42 includes openings in a floor 50 of the main chaffer 42 for grain and smaller MOG to fall through the openings (main chaffer floor 50 shown diagrammatically in FIGS. 3 and 4). The main chaffer 42 advances crop material (mainly MOG) that does not fall through its openings rearwardly.

The sieve 34 is positioned under the main chaffer 42 to receive crop material therefrom. The sieve further filters crop material for grain. Reciprocation of the sieve 34 in a fore-aft manner in the fore-aft dimension 44 advances MOG rearwardly.

The fan assembly 38 blows air rearwardly through and across the chaffers 32, 36 and sieve 34 to advance MOG to the residue system 26 for discharge from the combine harvester 10.

Referring to FIGS. 2, 3, and 6-8, as indicated herein, the return pan 36 is arranged to reciprocate in a fore-aft manner to advance crop material forwardly. In so doing, grain of such crop material tends to separate from MOG thereof to form a layer of grain under MOG on a floor 52 of the return pan 36. The floor 52 includes a rear stepped portion 54 and a front perforated portion 56 forward of the rear stepped portion 54. Grain tends to collect under MOG in the troughs between the steps of the stepped portion 54 upon forward advancement on the stepped portion 54. When grain reaches the front perforated portion 56, it encounters openings 58 included in the front perforated portion 56, and some of that grain falls through those openings 58. The return pan 36 thus includes openings 58 that allow grain to fall from the return pan 36 through the openings 58.

Grain that does not fall through the openings 58 may continue to advance forwardly to the front edge of the return pan 36 where that grain and MOG fall onto a flow of crop material advanced rearwardly by the chaffer 31. Much of the crop material advanced rearwardly by the chaffer 31 is MOG.

Figure 4:
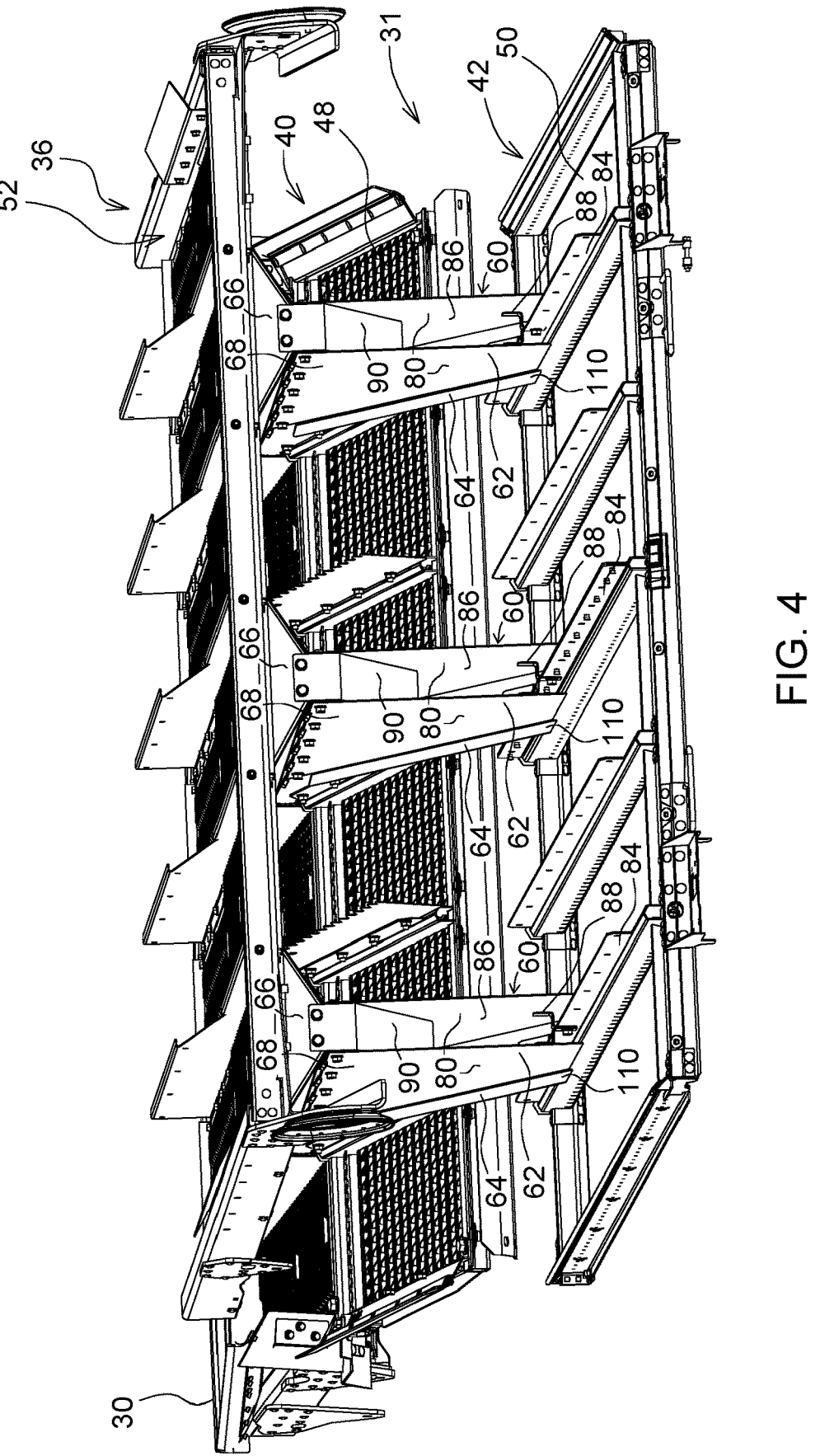
FIG. 4 is a rear perspective view showing the grain chutes positioned between the return pan and the main chaffer.
Figure 5:
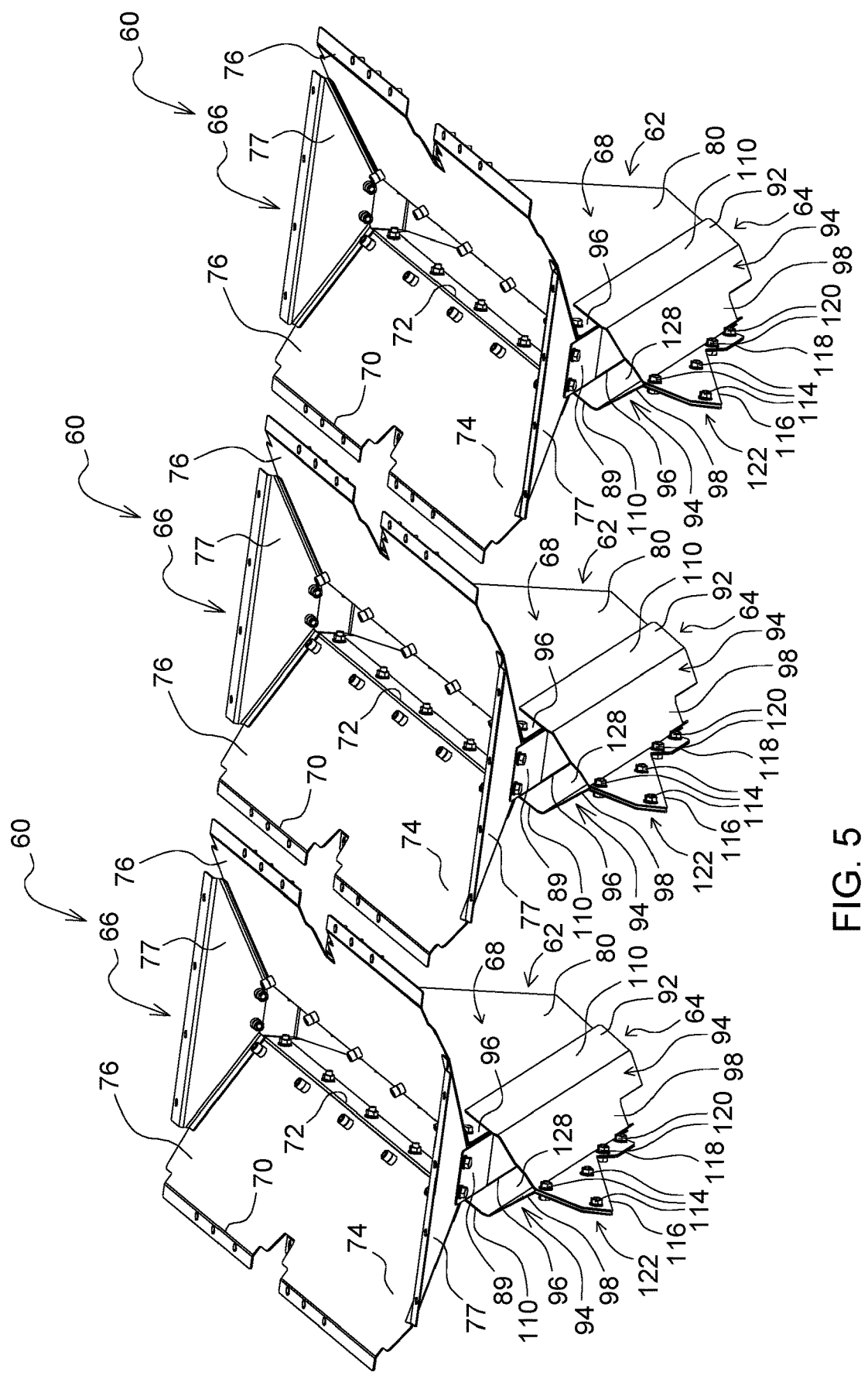
FIG. 5 is a front perspective view showing the grain chutes.

Referring to FIGS. 4-5, grain that falls through the openings 58 in the return pan 30 is chuted to the chaffer 31 to avoid getting caught up in MOG advanced rearwardly by the chaffer 31 and the consequent need for separation from that MOG. The cleaning system 20 includes a grain chute 60 positioned in communication with one or more openings of the openings 58 in the return pan 36 and in communication with the chaffer 31 to guide grain received from the one or more openings 58 to the chaffer 31. It does so in a manner that bypasses MOG of the crop material advanced rearwardly by the chaffer 31.

The cleaning system 20 may include more than one grain chute 60. For example, the cleaning system 20 includes a first grain chute 60, a second grain chute 60, and a third grain chute 60. The grain chutes 60 are positioned in lateral relation to one another (i.e., lateral relative to the forward direction of travel 12) (e.g., aligned laterally relative to one another). As such, the grain chutes 60 are positioned respectively in communication with one or more first openings 58 of the openings 58, one or more second openings 58 of the openings 58, and one or more third openings 58 of the openings 58 and in communication with the chaffer 31 to guide grain received respectively from the first openings 58, the second openings 58, and the third openings 58 to the chaffer 31. Since the grain chutes 60 are similar in structure and function to one another, the description of one applies to the others. Likewise, since the first openings 58, the second openings 58, and the third openings 58 are similar in structure and function to one another, the description of one set applies to the other sets.

Figure 6:
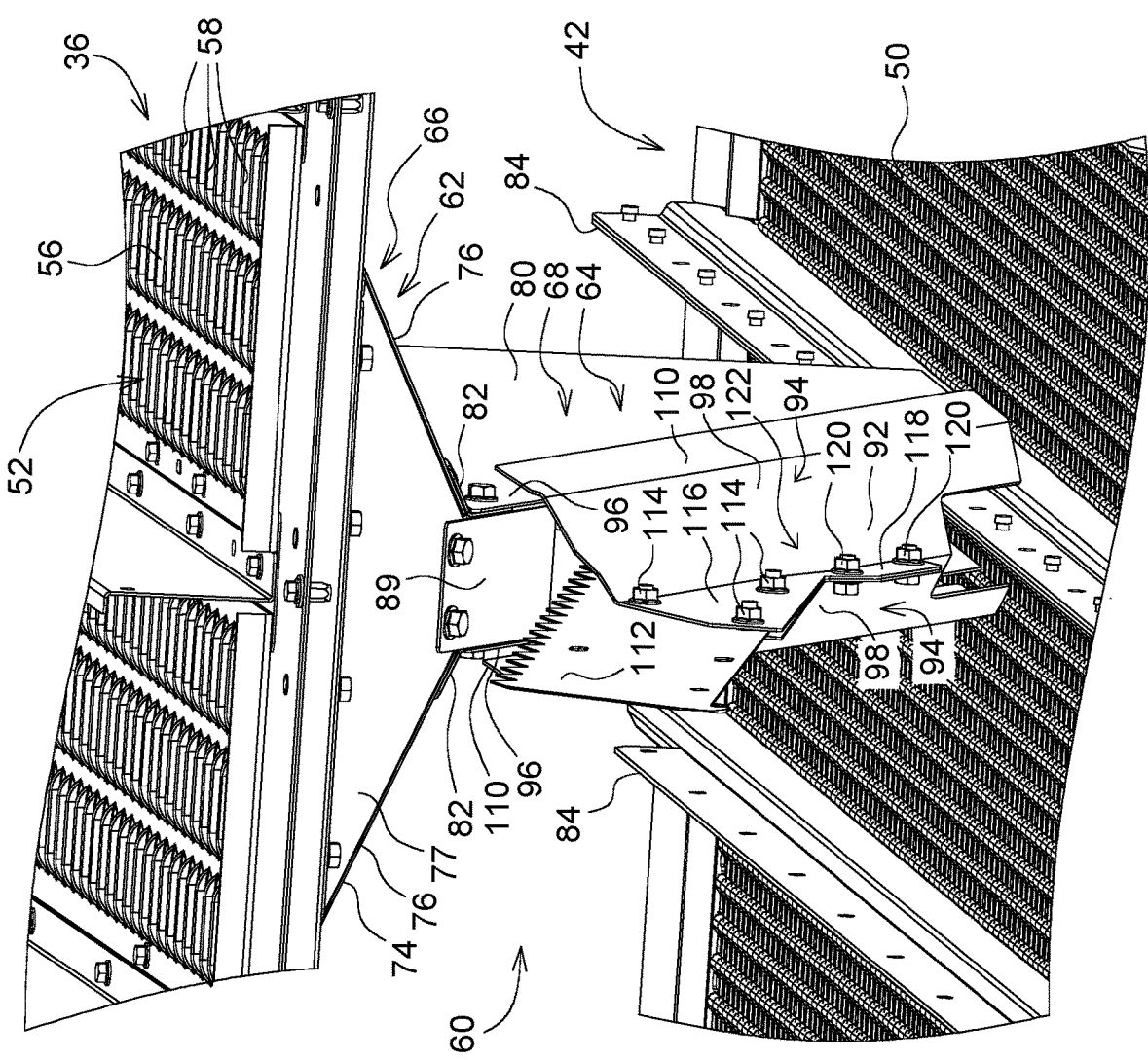
FIG. 6 is a front perspective view showing a grain chute positioned between the return pan and the main chaffer.
Figure 7:
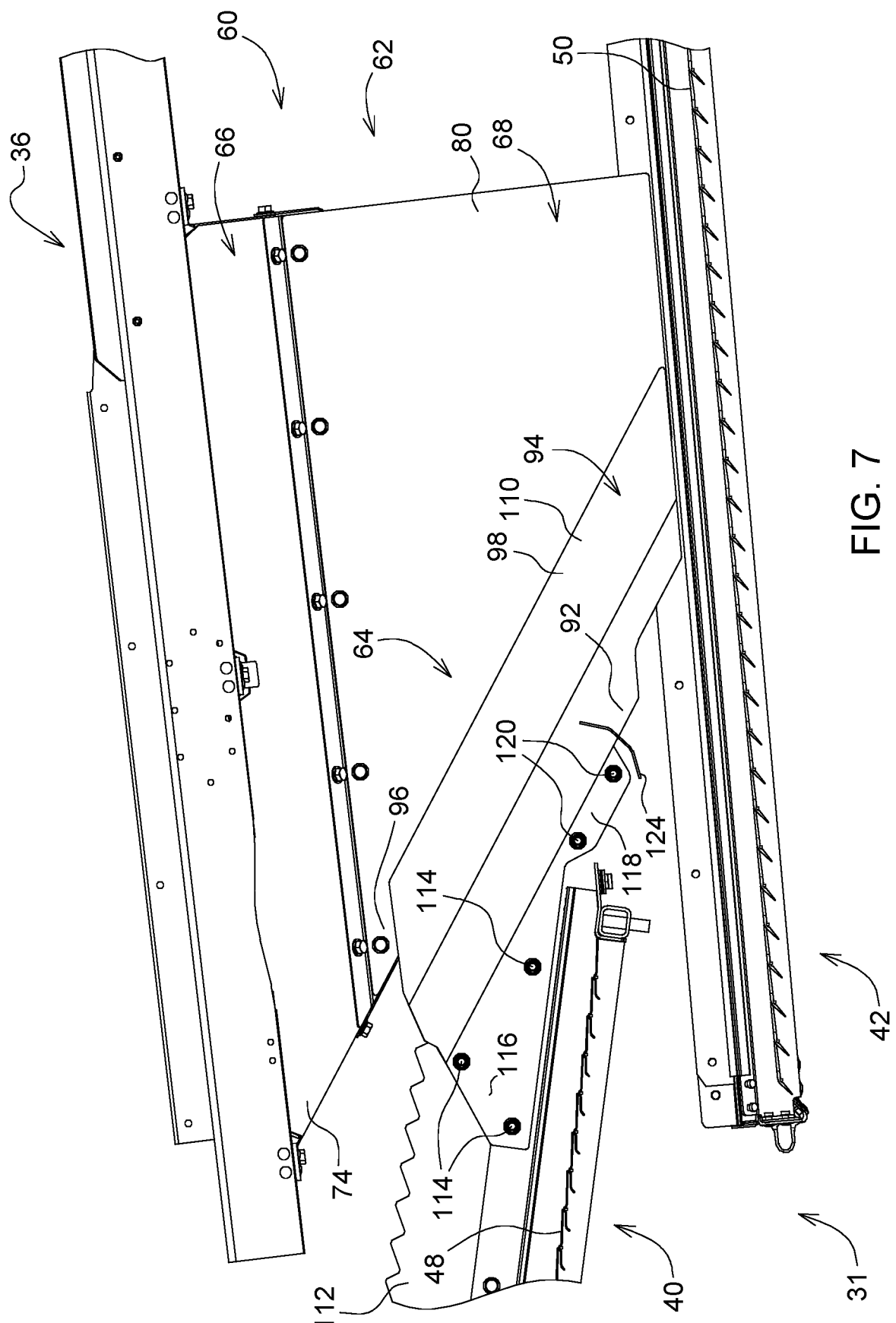
FIG. 7 is a side elevational view showing the grain chute, with portions broken away, the grain chute including a funnel coupled to the return pan for reciprocation therewith and a MOG diverter coupled to the chaffer (e.g., the front chaffer) for reciprocation therewith.
Figure 8:
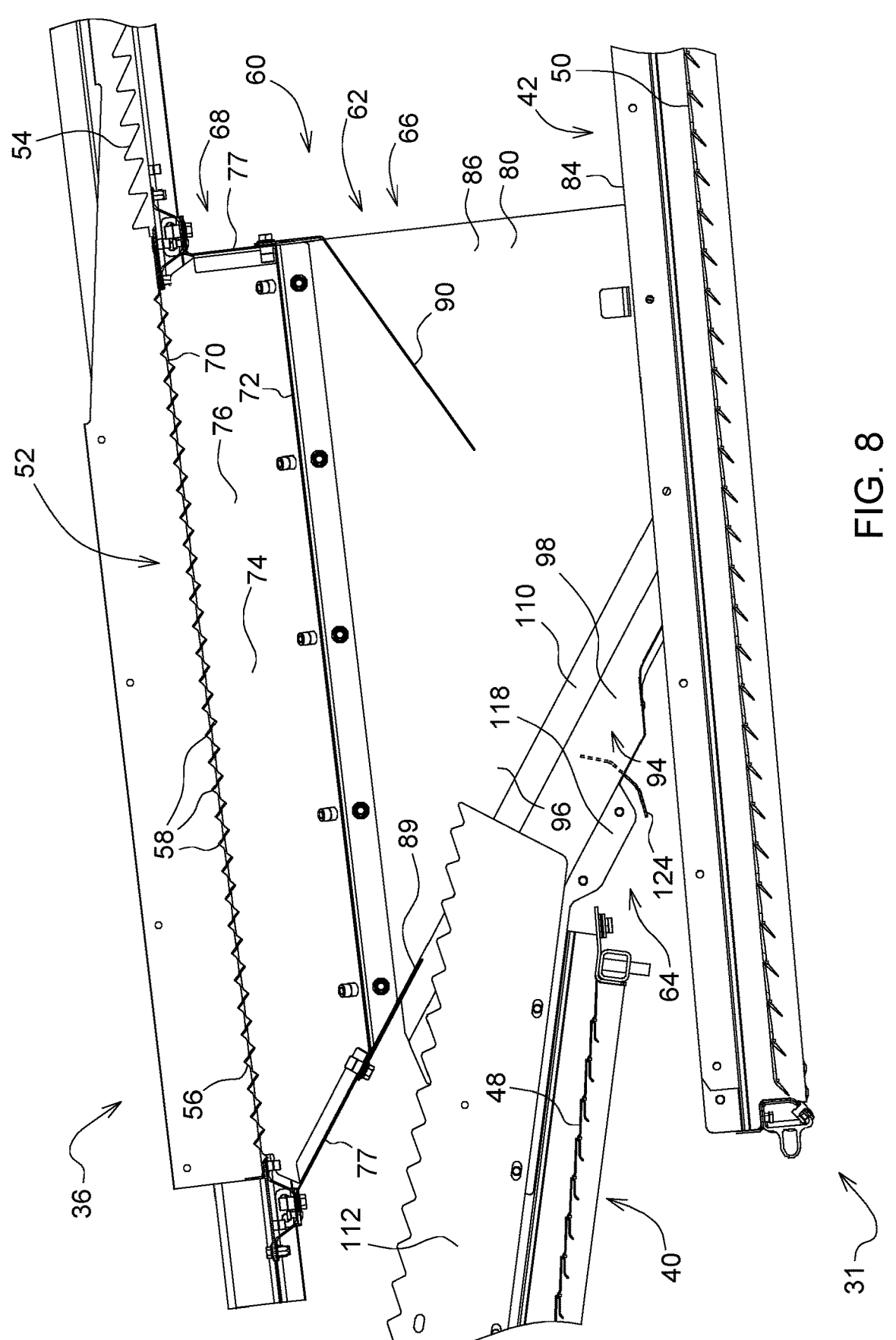
FIG. 8 is a side elevational view showing the grain chute, with portions broken away.

Referring to FIGS. 6-8, the grain chute 60 is positioned between the return pan 36 and the chaffer 31 to guide grain received from the return pan 36 to the chaffer 31. The grain chute 60 is positioned in communication with the one or more openings 58 and the chaffer 31. The grain chute 60 underlies the perforated portion 56 of the return pan 36 to receive grain that falls through the openings 58 of the perforated portion 56.

Illustratively, the grain chute 60 is positioned in communication with the one or more openings 58 and the main chaffer 42 to guide grain received from the one or more openings 58 to the main chaffer 42. The grain chute 60 is positioned between the perforated portion 56 and the main chaffer 42 to guide grain received from the perforated portion 56 to the main chaffer 42.

Referring to FIGS. 6-8, the grain chute 60 includes a funnel 62 and a MOG diverter 64. The funnel 62 is coupled to the return pan 36 for reciprocation therewith, and the MOG diverter 64 is coupled to the chaffer 31 for reciprocation therewith, such that the funnel 62 and the MOG diverter 64 are arranged for fore-aft movement relative to one another. The funnel 62 guides grain received from the one or more openings 58 to the chaffer 31. Illustratively, the funnel 62 guides grain received from the one or more openings 58 to the main chaffer 42. The MOG diverter 64 diverts MOG, advanced rearwardly by the chaffer 31, around the grain chute 60 so that grain in the grain chute 60 can bypass that MOG and pass to the chaffer 31, illustratively, the main chaffer 42. The diverter 64 shields grain chuted by the grain chute 60 from MOG advanced rearwardly by the chaffer 31.

Referring to FIGS. 6-10, the funnel 62 includes a receptacle 66 and a conduit 68 coupled to and depending from the receptacle 66. The receptacle 66 is tapered so as to include a larger open end 70, a smaller open end 72 smaller and lower than the larger open end 70, and a tapered body 74 extending between and coupled to the larger open end 70 and the smaller open end 70. The larger open end 70 is coupled to the return pan 36 and open to receive grain from the perforated portion 56. The body 74 guides grain to the smaller open end 72. The smaller open end 72 is open to dispense grain to the conduit 68.

Figure 11:
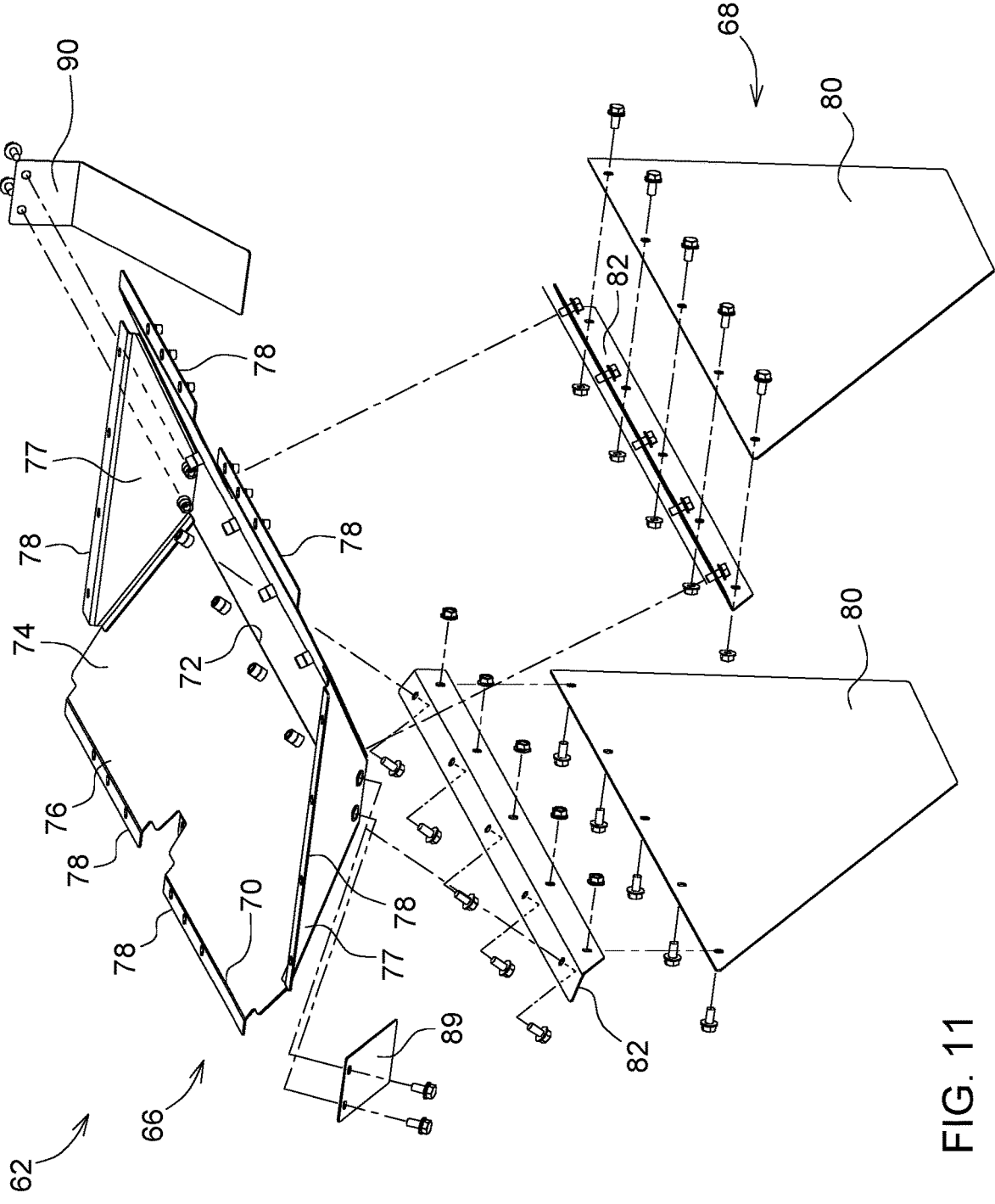
FIG. 11 is an exploded perspective view showing the funnel of the grain chute.
Figure 12:
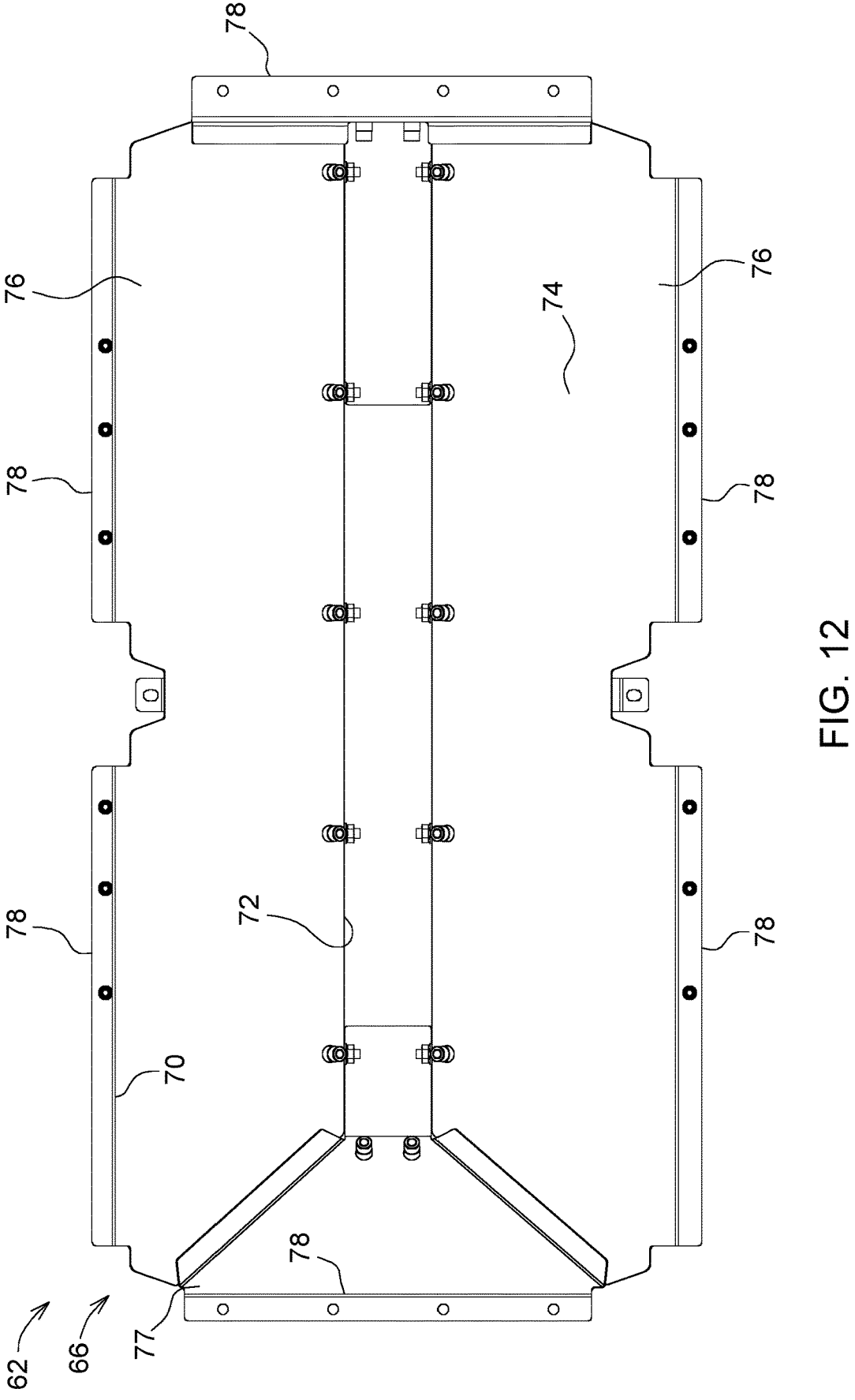
FIG. 12 is a top plan view showing the funnel of the grain chute.
Figure 13:
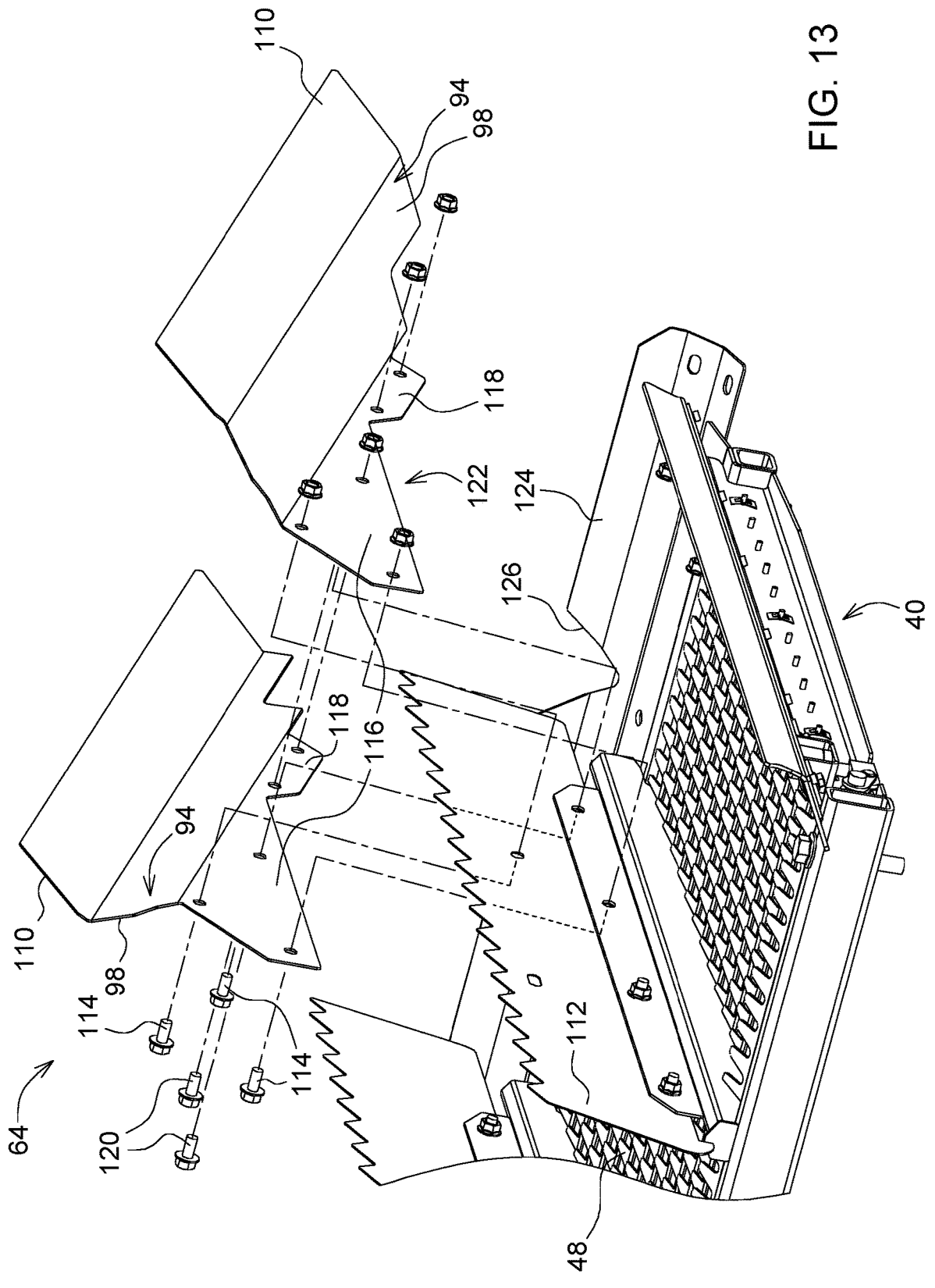
FIG. 13 is an exploded perspective view showing the MOG diverter of the grain chute.
Figure 14:
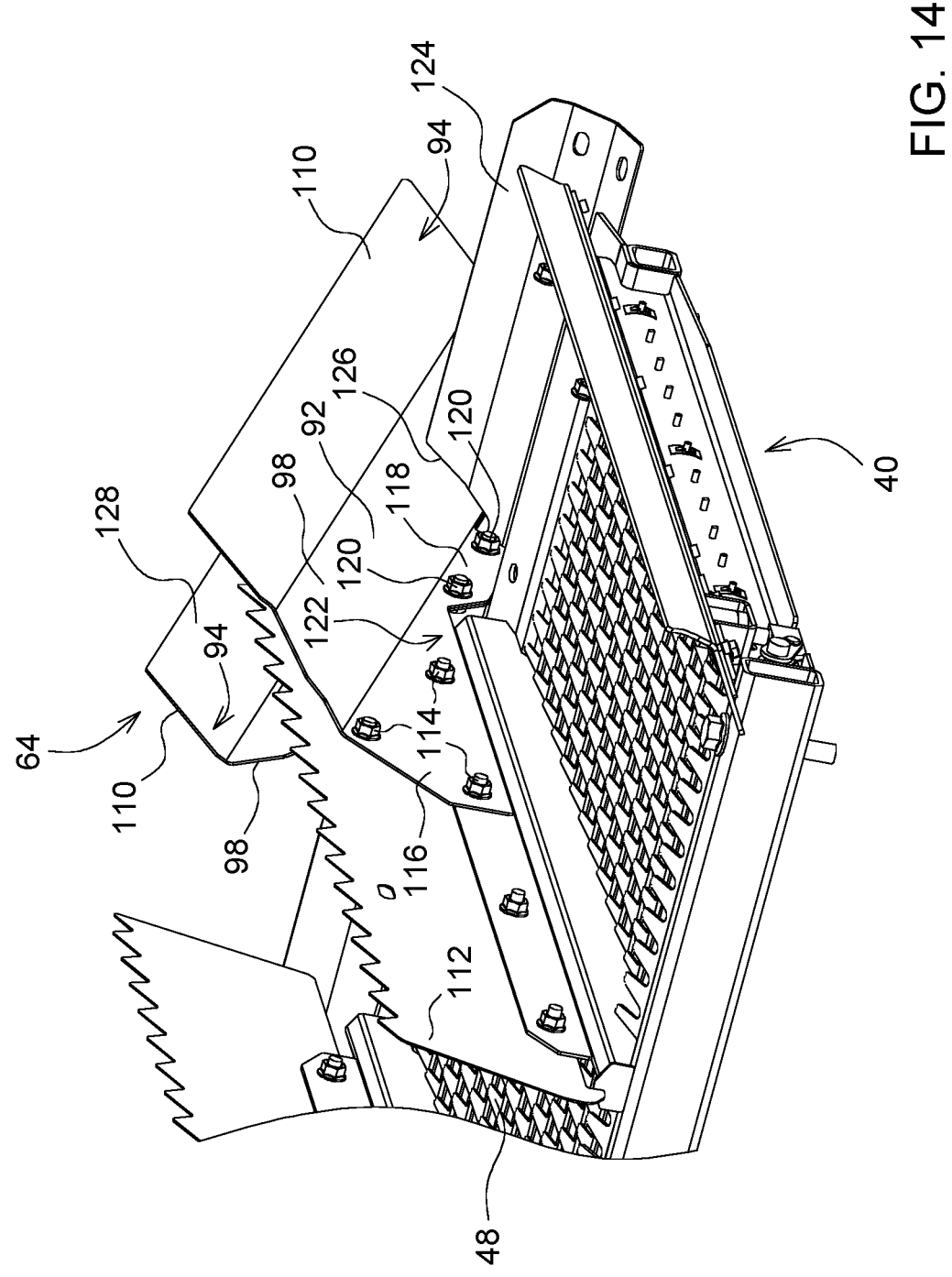
FIG. 14 is a front perspective view showing the MOG diverter coupled to a crop divider wall of the front chaffer.
Figure 15:
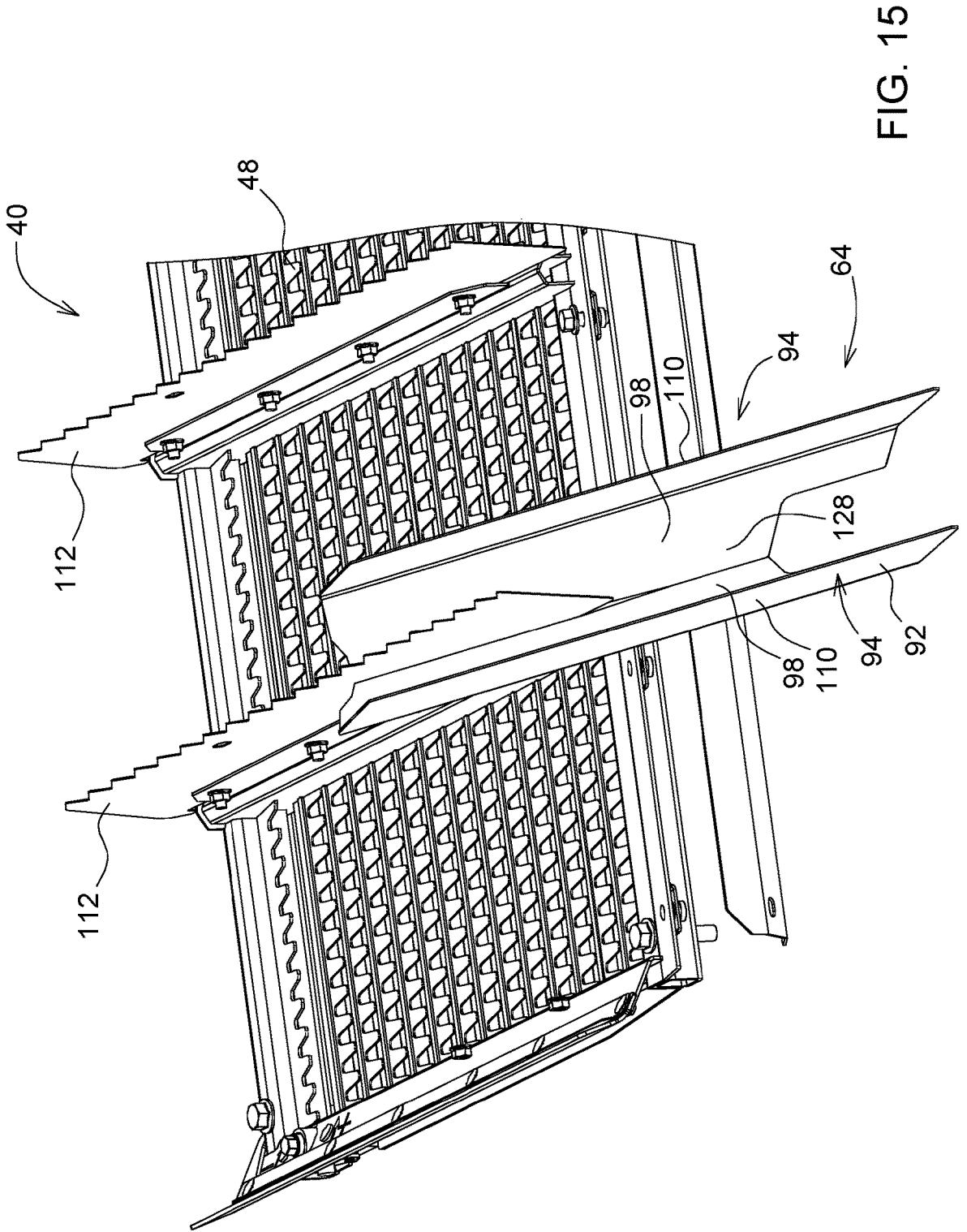
FIG. 15 is a rear perspective view showing the MOG diverter coupled to the crop divider wall of the front chaffer.

Referring to FIGS. 11 and 12, the receptacle 66 is coupled to the return pan 36. The receptacle 66 can have any suitable shape to funnel grain to the conduit 68. For example, the body 74 includes four walls tapering from the larger open end 70 to the smaller open end 72. The walls include a first funnel side wall 76, a second funnel side wall 76, a funnel front wall 76, and a funnel rear wall 77. The first and second funnel side walls 76 are longer than the funnel front and rear walls 76. The first funnel side wall 76 and the second funnel side wall 76 are spaced apart and positioned in lateral relation to one another. The funnel front wall 77 and the funnel rear wall 77 are spaced apart and positioned in fore-aft relation to one another. Each funnel side wall 76 is coupled to and positioned at rights angles to the adjacent funnel front and rear walls 77. As such, the receptacle 66 is generally rectangular in cross-section. The body 74 may be constructed of sheet metal or other suitable construction.

The larger open end 70 includes flanges 78 that are fastened to the return pan 36 with fasteners. Each flange 78 may be integrated with a respective wall 76, 76, or be a separate component.

The conduit 68 is coupled to the smaller open end 72. The conduit 68 depends from the smaller open end 72 toward the chaffer 31, illustratively, toward the main chaffer 42.

The conduit 68 includes a first conduit side wall 80 and a second conduit side wall 80. The conduit side walls 80 may be constructed of sheet metal or other suitable construction. The first conduit side wall 80 and the second conduit side wall 80 are spaced apart and positioned in lateral relation to one another. The first conduit side wall 80 is coupled to the first funnel side wall 76 with a first bracket 82, and the second conduit side wall 80 is coupled to the second funnel side wall 76 with a second bracket 82. The first bracket 82 is fastened to the first funnel side wall 76 with fasteners, and the first conduit side wall 80 is fastened to the first bracket 82 with fasteners. The second bracket 82 is fastened to the second funnel side wall 76 with fasteners, and the second conduit side wall 80 is fastened to the second bracket 82 with fasteners.

Referring to FIGS. 4 and 6, the main chaffer 42 includes crop divider walls 84 that extend longitudinally in the fore-aft dimension 44 and partition the chaffer 42 into bays to reduce lateral flow of crop material on the chaffer 42. The grain chute 60 is associated with a respective one of the crop divider walls 84. The conduit side walls 80 extend downwardly toward the main chaffer 42 to a point near the floor 50 of the main chaffer 42 to guide grain thereto. Lower portions of the conduit side walls 80 are positioned on either side of the crop divider wall 84, such that the crop divider wall 84 is positioned laterally between the first conduit side wall 80 and the second conduit side wall 80.

Rearward flow of MOG around the grain chute 60 may apply lateral pressure to the conduit side walls 80. Such lateral pressure could cause relative lateral movement of the conduit side walls 80 toward one another, thereby laterally constricting a grain passageway 86 defined by the grain chute 60 and extending from an inlet of the grain chute 60 to an outlet of the grain chute 60. Such lateral constriction could inhibit flow of grain through the grain chute 60. A wall separator 88 is coupled to the crop divider wall 84 and positioned laterally between the first conduit side wall 80 and the second conduit side wall 80 to limit relative lateral movement of the first and second conduit side walls 80 toward one another, to avoid overly laterally constricting the grain passageway 86.

Figure 9:
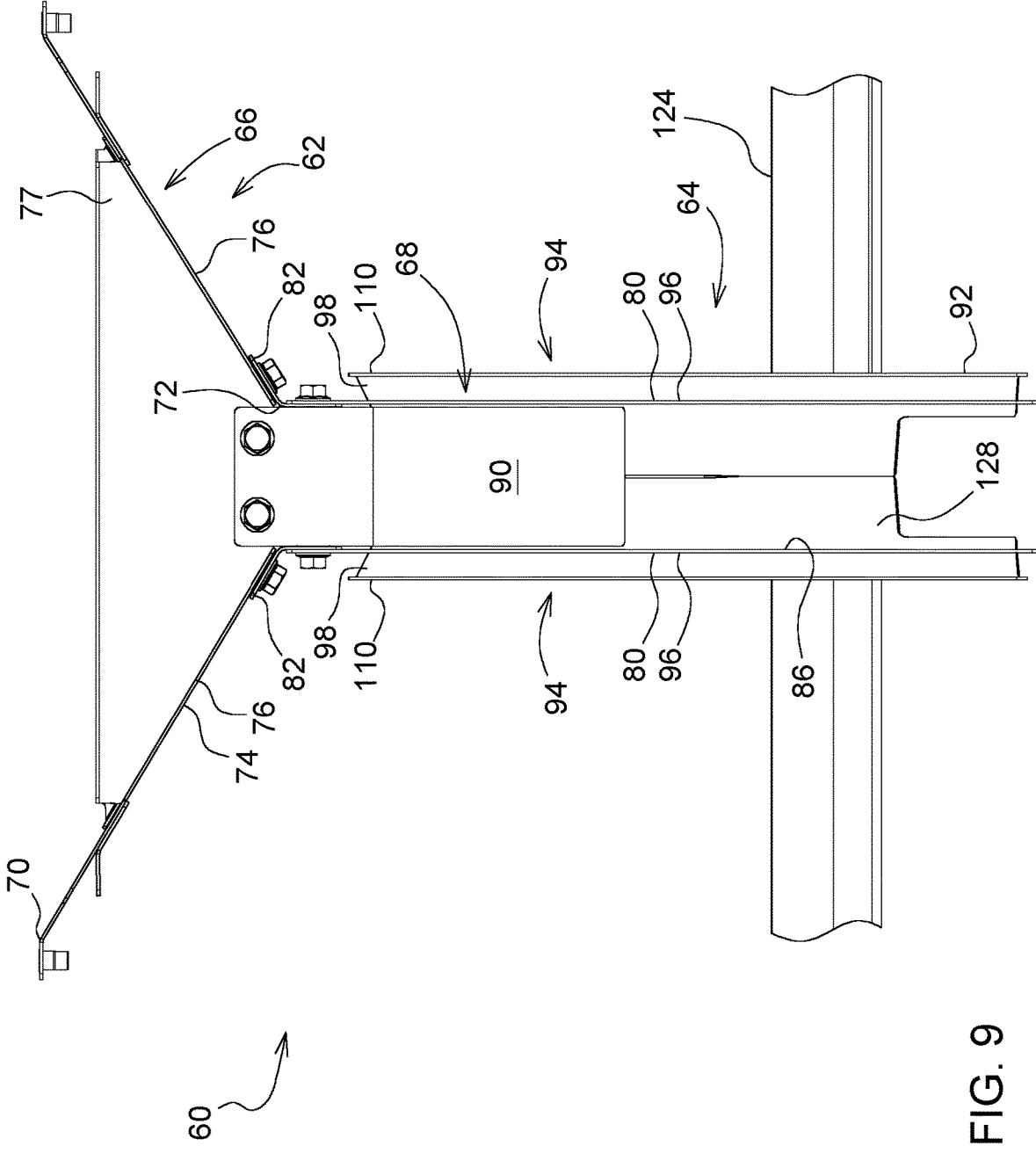
FIG. 9 is a rear elevational view showing the grain chute.
Figure 10:
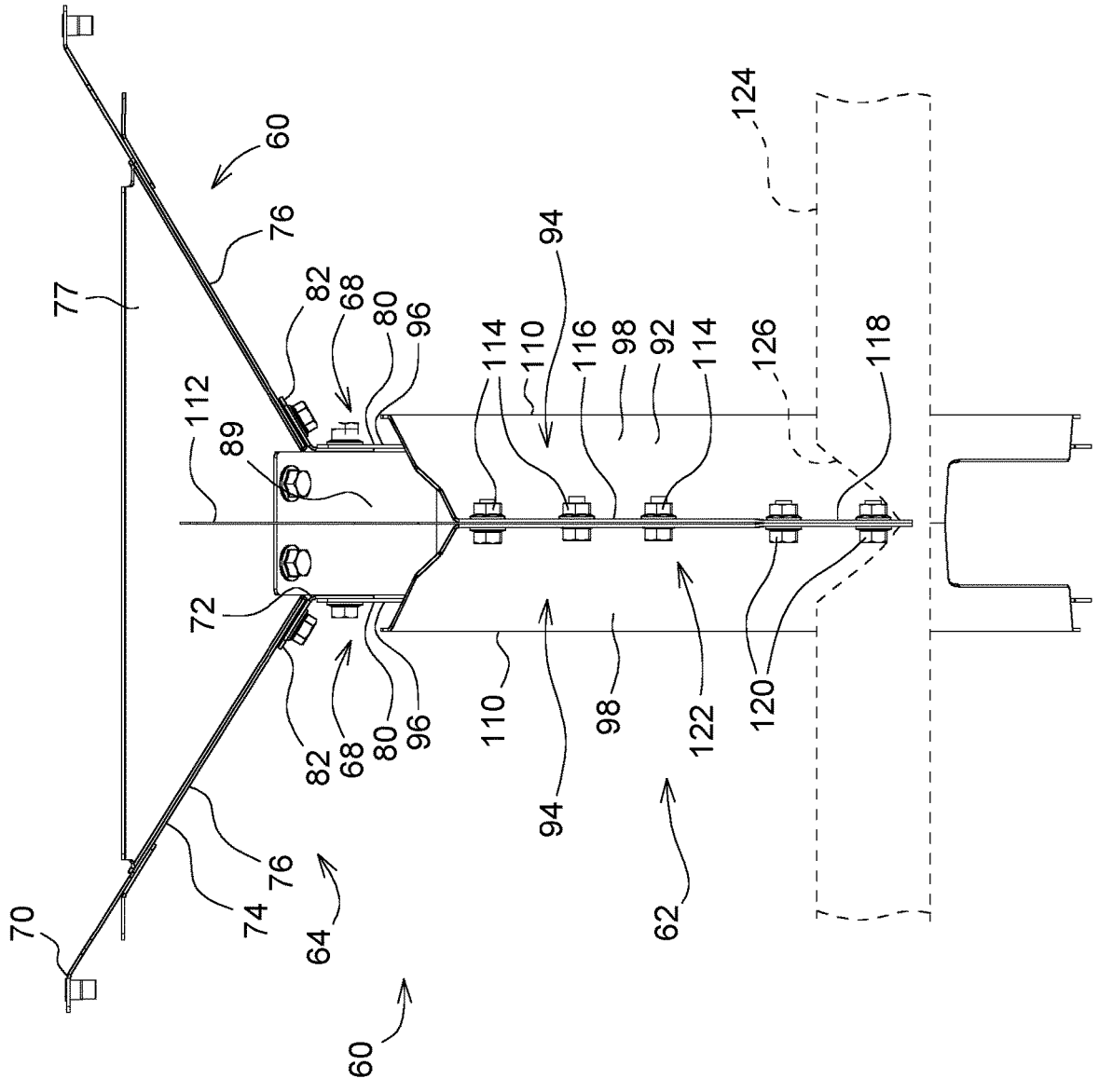
FIG. 10 is a front elevational view showing the grain chute.

Referring to FIGS. 8-10, the conduit 68 includes a conduit front wall 89 and a conduit rear wall 90. The conduit front wall 89 and the conduit rear wall 90 are spaced apart and positioned in fore-aft relation to one another. The conduit front wall 89 is positioned at a front end of the conduit 68 and is coupled to the funnel front wall 77 with fasteners. The conduit rear wall 90 is positioned at a rear end of the conduit 68 and is coupled to the funnel rear wall 77 with fasteners. The walls 89, 90 extend downwardly from the funnel 62. Illustratively, the rear wall 90 extends downwardly and forwardly from a bend in the rear wall 90. In other embodiments, the rear wall 90 may be straight so as to extend downwardly along the rear edges of the conduit side walls 80. The walls 89, 90 do not extend downwardly quite as far as the conduit side walls 80, avoiding interference with the crop divider wall 84, fostering air flow, and reducing material and corresponding weight and opportunities for plugging.

The funnel 62 may be configured in a wide variety of ways. In some embodiments, the receptacle 66 may have an inverted frusto-conical shaped, and the conduit 68 may be tubular with a circular cross-section.

Referring to FIGS. 5-7 and 13-15, the MOG diverter 64 is positioned in front of the funnel 62 to divert MOG around the funnel 62 as the chaffer 31 advances MOG rearwardly. Illustratively, the diverter 64 is positioned in front of the conduit 68 to divert MOG around the conduit 68. The diverter 64 diverts MOG laterally around either side of the conduit 68 as the chaffer 31 advances the MOG rearwardly.

The diverter 64 includes a shield 92. The shield 92 diverts MOG around the funnel 62 and the conduit 68, to shield grain, falling from the perforated portion 56 through the funnel 62 and the conduit 68 to the main chaffer 42, from the MOG. The shield 92 is generally V-shaped.

The diverter 64 includes a first diverter wall 94 and a second diverter wall 94. The diverter walls 94 cooperate to provide the shield 92. The diverter walls 94 spread laterally apart away from one another as the diverter walls 94 extend rearwardly to divert MOG laterally around the funnel 62 and the conduit 68 thereof. Each diverter wall 94 may be constructed of sheet metal or other suitable construction.

The diverter 64 and its shield 92 laterally overlap the funnel 62 and its conduit 68 thereof. The funnel 62 and its conduit 68 are positioned laterally between the diverter walls 94. A front portion 96 of the first conduit side wall 80 and a front portion 96 of the second conduit side wall 80 are positioned laterally between the diverter walls 94.

Each diverter wall 94 includes an angled portion 98 and a rear portion 110. The angled portions 98 diverge laterally away from one another as the angled portions 98 extend rearwardly. The rear portions 110 extend rearwardly from the respective angled portions 98 in parallel to one another so as to laterally overlap the front portions 96 of the conduit side walls 80. The front portions 96 of the conduit side walls 80 are positioned laterally between the rear portions 110 of the diverter walls 94. The angled portions 98 and the rear portions 110 cooperate to provide the shield 92.

The MOG diverter 64 is coupled to the front chaffer 40 for reciprocation therewith. The front chaffer 40 includes crop divider walls 112 that extend longitudinally in the fore-aft dimension 44 and partition the front chaffer 40 into bays to reduce lateral flow of crop material on the front chaffer 40. The diverter 64 is coupled to a respective crop divider wall 112. The diverter 64 is coupled to the crop divider wall 112 with fasteners 114 (e.g., three fasteners 114). The diverter walls 94 sandwich the crop divider wall 112 therebetween.

Each diverter wall 94 includes an upper tab 116 and a lower tab 118. The upper and lower tabs 116, 118 of a respective diverter wall 94 extend forwardly from the respective angled portion 98. The upper tabs 116 cooperate to provide the nose 116. The upper tabs 116 sandwich the crop divider wall 112 therebetween. The upper tabs are fastened to one another and to the crop divider wall 112 with the fasteners 114. The lower tabs 118 are positioned in face-to-face contact and are fastened to one another with fasteners 120 (e.g., two fasteners 120). The upper and lower tabs 116, 118 and the fasteners 114, 120 cooperate to provide the diverter 64 with a connector 122 that connects the diverter 64 to the crop divider wall 112.

The diverter 64 is angled downwardly and rearwardly. The diverter 64 extends downwardly from the crop divider wall 112 as the diverter 64 extends rearwardly. The frame of the front chaffer 40 includes a cross bar 124 at the rear of the front chaffer 40. The diverter 64 passes through, and is positioned in, a notch 126 of the cross bar 124 as the diverter 64 extends downwardly and rearwardly. The notch 126 blocks or otherwise limits lateral movement of the diverter 64.

The diverter 64 extends downwardly and rearwardly beyond the cross bar 124 toward the main chaffer 42 to a level near the floor 50 of the main chaffer 42, at the same level as the conduit side walls 80 or thereabout, to protect grain falling through the conduit 68 from MOG. It is the shield 92 of the diverter 64 that so extends. Lower portions of the rear portions 110 of the diverter walls 94 are positioned on either side of the crop divider wall 84 of the main chaffer 42, such that the crop divider wall 84 is positioned laterally between the first and second diverter walls 94.

The diverter 64 includes a channel 128 to guide grain received from the one or more openings 58 to the chaffer 31. The shield 92 includes the channel 128. As such, the channel 128 extends downwardly and rearwardly. Grain that falls from the perforated portion 56 through the funnel 62 may fall into the channel 128. The channel 128 guides that grain to the main chaffer 42.

Referring to FIGS. 2 and 6-8, the funnel 62 and the diverter 64 are arranged for fore-aft movement relative to one another. The funnel 62 is coupled to the return pan 36 for fore-aft movement therewith, and the diverter 64 is coupled to the chaffer 31 for fore-aft movement therewith. As such, the funnel 62 and the diverter 64 move in a fore-aft manner 180 degrees out of phase with one another. In so doing, the funnel 62 moves forwardly and rearwardly within the diverter 64 as the diverter 64 moves forwardly and rearwardly 180 degrees out of phase with the funnel 62. The front edges of the first and second conduit side walls 80 may remain laterally between the diverter walls 94 during such relative fore-aft movement. In some embodiments, the crop divider wall 112 of the front chaffer 40 may extend rearwardly under the conduit front wall 89 into a space laterally between the first and second conduit side walls 80 during relative fore-aft movement between the funnel 62 and the diverter 64.

In some embodiments, the grain chute 60 may employ a slide in place of the funnel 62. In such a case, the slide may be configured, for example, as a plate that slopes downwardly as it extends laterally. The slide is arranged to guide grain received from the openings 58 to the channel 128 or otherwise to the main chaffer 42. The slides of two adjacent grain chutes 60 may be integrated into a piece of sheet metal coupled to the return pan 36 for reciprocation therewith and bent on one side to provide the slide of one grain chute 60 and bent on the other side to provide the slide of the other grain chute 60.

In some embodiments, the diverter 64 may be integrated into the conduit 68. In such a case, the conduit front wall 89 may extend further downwardly to generally close the front space laterally between the conduit side walls 80, and the conduit front wall 89 may be shaped (e.g., V-shaped) to divert MOG around the conduit 68.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A grain cleaning system for use in an agricultural combine harvester that moves in a forward direction of travel to harvest crop material from a field, the grain cleaning system comprising:

a return pan arranged to reciprocate in a fore-aft manner to advance crop material forwardly, the return pan comprising openings allowing grain to fall from the return pan through the openings, a chaffer arranged to reciprocate in a fore-aft manner to advance crop material rearwardly, the chaffer underlying the return pan, and a grain chute positioned in communication with one or more openings of the openings in the return pan and in communication with the chaffer to guide grain received from the one or more openings to the chaffer in a manner that bypasses material-other-than-grain (MOG) advanced rearwardly by the chaffer.

2. The grain cleaning system of claim 1, wherein the grain chute is positioned between the return pan and the chaffer.

3. The grain cleaning system of claim 1, wherein the return pan comprises a floor, the floor comprises a rear stepped portion and a front perforated portion comprising the openings, and the grain chute underlies the perforated portion.

4. The grain cleaning system of claim 1, wherein the grain chute comprises a funnel coupled to the return pan for reciprocation therewith.

5. The grain cleaning system of claim 4, wherein the funnel comprises a receptacle and a conduit, the receptacle comprises a larger open end coupled to the return pan, a smaller open end, and a tapered body extending between the larger open end and the smaller open end, and the conduit depends from the smaller open end toward the chaffer.

6. The grain cleaning system of claim 5, wherein the conduit comprises a first conduit side wall and a second conduit side wall positioned in lateral relation to the first conduit side wall, and the chaffer comprises a crop divider wall positioned laterally between the first conduit side wall and the second conduit side wall.

7. The grain cleaning system of claim 6, comprising a wall separator coupled to the crop divider wall and positioned laterally between the first conduit side wall and the second conduit side wall to limit relative lateral movement of the first and second conduit side walls toward one another.

8. The grain cleaning system of claim 5, wherein the grain chute comprises a MOG diverter coupled to the chaffer for reciprocation therewith and positioned in front of the conduit to divert MOG around the conduit.

9. The grain cleaning system of claim 8, wherein the conduit comprises a first conduit side wall and a second conduit side wall positioned in lateral relation to the first conduit side wall, the MOG diverter comprises a first diverter wall and a second diverter wall, and the first diverter wall and the second diverter wall spread laterally apart away from one another as the first diverter wall and the second diverter wall extend rearwardly such that a front portion of the first conduit side wall and a front portion of the second conduit side wall are positioned laterally between the first diverter wall and the second diverter wall.

10. The grain cleaning system of claim 9, wherein the chaffer comprises a front chaffer and a main chaffer rearward of the front chaffer, and the first diverter wall and the second diverter wall are coupled to a crop divider wall of the front chaffer.

11. The grain cleaning system of claim 9, wherein the chaffer comprises a front chaffer and a main chaffer, and the main chaffer comprises a crop divider wall positioned laterally between the first conduit side wall and the second conduit side wall and laterally between the first diverter wall and the second diverter wall.

12. The grain cleaning system of claim 4, wherein the grain chute comprises a MOG diverter coupled to the chaffer for reciprocation therewith and positioned in front of the funnel to divert MOG around the funnel.

13. The grain cleaning system of claim 12, wherein the MOG diverter comprises a channel to guide grain received from the one or more openings to the chaffer.

14. The grain cleaning system of claim 12, wherein the MOG diverter comprises a first diverter wall and a second diverter wall, the first diverter wall and the second diverter wall spread laterally apart away from one another as the first diverter wall and the second diverter wall extend rearwardly such that the funnel is positioned laterally between the first diverter wall and the second diverter wall.

15. The grain cleaning system of claim 1, wherein the grain chute comprises a MOG diverter coupled to the chaffer for reciprocation therewith to divert MOG around the grain chute.

16. The grain cleaning system of claim 15, wherein the MOG diverter comprises a channel to guide grain received from the one or more openings to the chaffer.

17. The grain cleaning system of claim 1, comprising a second grain chute positioned in communication with one or more other openings of the openings in the return pan and in communication with the chaffer to guide grain received from the one or more other openings to the chaffer, and the grain chute and the second grain chute are positioned in lateral relation to one another.

18. An agricultural combine harvester that moves in a forward direction of travel to harvest crop material from a field, the agricultural combine harvester comprising:

a return pan arranged to reciprocate in a fore-aft manner to advance crop material forwardly, the return pan comprising openings in a floor of the return pan for grain to fall through the openings, a chaffer arranged to reciprocate in a fore-aft manner to advance crop material rearwardly, and a grain chute positioned in communication with one or more openings of the openings in the return pan and in communication with the chaffer to guide grain received 5 from the one or more openings to the chaffer, the grain chute comprising a funnel coupled to the return pan for reciprocation therewith and a material-other-than-grain (MOG) diverter coupled to the chaffer for reciprocation therewith and positioned in front of the funnel to divert 10 MOG around the funnel.

19. The agricultural combine harvester of claim 18, wherein the MOG diverter laterally overlaps the funnel.

\* \* \* \* \*